US008608875B1

(12) United States Patent
Bullard

(10) Patent No.: US 8,608,875 B1
(45) Date of Patent: Dec. 17, 2013

(54) SPONGE-IRON ALLOYING

(71) Applicant: Arcanum Alloy Design Inc., Sunnyvale, CA (US)

(72) Inventor: Daniel E. Bullard, Valparaiso, IN (US)

(73) Assignee: Arcanum Alloy Design Inc., Sunnyvale, CA (US)

(*) Notice: Subject to any disclaimer, the term of this patent is extended or adjusted under 35 U.S.C. 154(b) by 0 days.

(21) Appl. No.: 13/776,941

(22) Filed: Feb. 26, 2013

Related U.S. Application Data

(60) Provisional application No. 61/646,437, filed on May 14, 2012.

(51) Int. Cl.
*C21D 7/13* (2006.01)
*C21D 8/02* (2006.01)
*C21D 1/72* (2006.01)

(52) U.S. Cl.
USPC ............ 148/529; 148/534; 148/537; 148/648

(58) Field of Classification Search
USPC .................... 148/529, 534, 537, 648
See application file for complete search history.

(56) References Cited

U.S. PATENT DOCUMENTS

| | | | | |
|---|---|---|---|---|
| 2,794,630 | A | * | 6/1957 | Turner, Jr. ............... 266/110 |
| 3,902,892 | A | * | 9/1975 | Easwaran et al. ........... 75/315 |
| 6,087,019 | A | * | 7/2000 | Isobe et al. .............. 428/472 |
| 6,258,186 | B1 | * | 7/2001 | Choi ..................... 148/533 |

FOREIGN PATENT DOCUMENTS

| | | | |
|---|---|---|---|
| CA | 1170838 | A | 7/1984 |
| DE | 2507242 | A * | 9/1975 |
| JP | 2009062590 | A * | 3/2009 |

OTHER PUBLICATIONS

Machine translation of JP 2009-062590 A by Yamada, Eiko published Mar. 2009.*
Bramfitt, B. L. "ASM Handbooks Online." Heat Treating vol. 4. ASM International, 1991. Web. Jul. 24, 2013. <http://products.asminternational.org/hbk/index.jsp>.*
Wisti, M., and M. Hingwe. "Heat Treating vol. 4." ASM Handbooks Online. ASM Handbook, 1991. Web. Jul. 24, 2013.*
Schwartz, Harold. "Iron." Prokon. Version 8.6 by ShowMe Software. 1997-98.*
Sponge iron. (n.d.). Dictionary.com Unabridged. Retrieved Jul. 24, 2013, from Dictionary.com website: http://dictionary.reference.com/browse/Sponge iron.*
Machine translation of DE 2507242 A published Sep. 1975.*
Piwonka, Thomas S. "Foundry Practice for Ferrous Alloys". Metals Handbook Desk Edition, 2nd edition. 1998.*

(Continued)

*Primary Examiner* — George Wyszomierski
*Assistant Examiner* — Tima M McGuthry Banks
(74) *Attorney, Agent, or Firm* — Synthesis Intellectual Property, LLC; Jonathan Goodman

(57) ABSTRACT

A steel manufacturing process can include forming an iron oxide layer on a hot band during hot rolling; reducing the iron oxide layer on the hot band to form a sponge iron layer that includes pores; the sponge-iron layer having a thickness in a range of about 0.05 μm to about 1000 μm, about 0.1 μm to about 100 μm, or about 5 μm to about 25 μm; and depositing an alloying element into the pores of the sponge iron layer to form an impregnated sponge-iron layer. The process can further include annealing the impregnated sponge-iron layer to produce an iron alloy layer carried by the substrate.

17 Claims, 2 Drawing Sheets

(56) References Cited

OTHER PUBLICATIONS

Hudson, R. M. "Pickling and Descaling". Surface Engineering, vol. 5. ASM Handbook, ASM International. 1994. pp. 67-78.*

International Search Report and Written Opinion of the International Searching Authority, Apr. 15, 2013.
American Galvanizers Association, "The HDG Coating," available at: galvanizeit.org/about-hot-dip-galvanizing/what-is-hot-dip-galvanizing/the-hdg-coating (retrieved Aug. 12, 2013).

* cited by examiner

US 8,608,875 B1

SPONGE-IRON ALLOYING

CROSS-REFERENCE

A benefit of priority is claimed to U.S. Provisional Patent Application No. 61/646,437 filed 14 May, 2012, the disclosure of which is incorporated herein in its entirety.

FIELD OF THE INVENTION

This disclosure relates to alloy compositions and the formation of surface alloys.

BACKGROUND

During the process of hot rolling in the manufacture of steel sheet or coil, the steel sheet is generally rolled at about 1,100° C. and then taken up in a roll at about 800° C. During the aforementioned process, the steel forms scale on its surface so long as the hot rolling is carried out in the open air. The scale layer can have a thickness of several microns to several tens of microns. The scale layer formed on the steel has a composition and structure varied by differences in the conditions of heat treatment during the process of manufacture, and has thermal and mechanical properties significantly different than the underlying steel. These thermal and mechanical differences can adversely affect the performance and longevity of steel processing equipment (e.g., rollers, presses, and cutters). Therefore, the scale layer is preferentially removed during the processing of the steel sheet, coil, or band.

The removal of this scale from band steel, steel sheet, or coil steel has been carried out by the pickling method which uses a strong acid such as hydrochloric acid, sulfuric acid, nitric acid, and hydrofluoric acid either independently of each other or as combined suitably. Since the pickling relies on the dissolution by a strong acid, it entails a problem of degrading the working environment. Moreover, disposal of the spent acid and the effluent from the pickling system, a huge investment on equipment is required for.

An alternatively, attempts have been made to physically remove scale from the steel sheet surface by spraying shot balls, grit or a slurry mixture of shot balls or grit with water onto the steel sheet surface. However, these techniques are mostly used together with a pickling process; that is, the surface abrasion of the sheet is often a pretreatment process for increasing the efficiency at which special steels such as stainless steel or electric steel sheets are pickled.

SUMMARY

One embodiment is a process that includes providing a substrate carrying a sponge-iron layer, the sponge-iron layer having a thickness in a range of about 0.05 µm to about 1000 µm, about 0.1 µm to about 100 µm, or about 5 µm to about 25 µm; and admixing a first alloying element with the sponge-iron layer to provide an impregnated sponge-iron layer carried by the substrate.

Another embodiment is a steel manufacturing process that includes forming an iron oxide layer on a hot band during hot rolling; reducing the iron oxide layer on the hot band to form a sponge iron layer that includes pores; and depositing an alloying element into the pores of the sponge iron layer to form an impregnated sponge-iron layer.

Still another embodiment is an iron alloy coating process that includes providing an substrate carrying an iron layer that carried an iron oxide layer; reducing the iron oxide layer to a sponge-iron layer that include pores; depositing at least one alloying element into the pores of the sponge iron layer to from an impregnated sponge-iron layer; and then heating the impregnated sponge-iron layer to an annealing temperature.

Yet another embodiment is an iron admixture layer carried by steel that includes a plurality of iron artifacts adhered to a surface of the steel; a plurality or continuation of impregnation artifacts disposed between and around the iron artifacts; and extending from the steel surface a concentration gradient within the iron admixture layer that includes a decrease in iron concentration as a function of distance from the steel surface.

Yet still another embodiment is an iron admixture layer carried by steel that includes a plurality of impregnation artifacts (e.g., iron insoluble or phase distinct intermetallics) surrounded by an iron matrix; the iron admixture layer having a thickness of less than 100 µm.

Even yet another embodiment is an iron alloy coated substrate that includes a porous substrate having an interstitial layer that comprises a heterogeneous admixture of the substrate and iron; the interstitial layer carrying an iron layer; the iron layer carrying an iron alloy layer that comprises iron and at least one alloying element.

DESCRIPTION OF THE FIGURES

For a more complete understanding of the disclosure, reference should be made to the following detailed description and accompanying drawing figures wherein.

Figure 1:
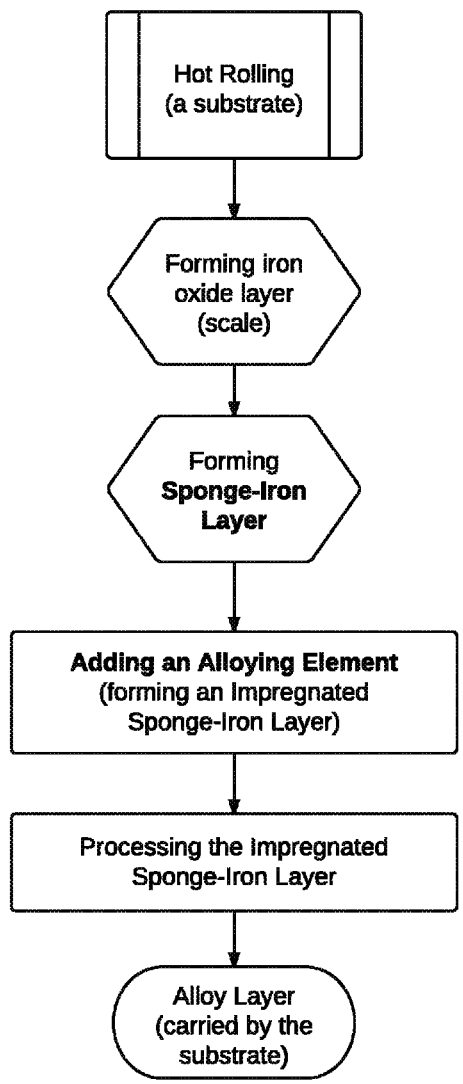
FIG. 1 is a depiction of one embodiment of the process described herein.
Figure 2:
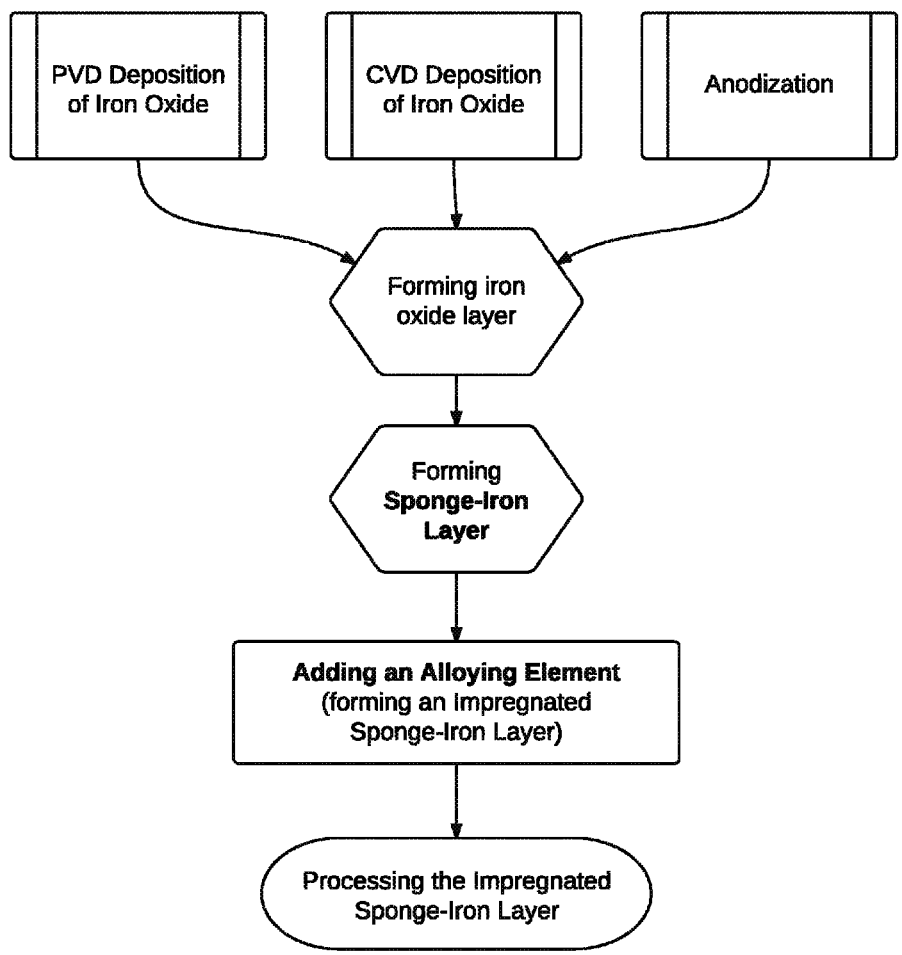
FIG. 2 is a depiction of other embodiments of the process described herein.

While specific embodiments are illustrated in the figures, with the understanding that the disclosure is intended to be illustrative, these embodiments are not intended to limit the invention described and illustrated herein.

DETAILED DESCRIPTION

Disclosed herein is a process for making iron alloys and the products of the process that can include layers of iron admixtures or iron alloys. A first embodiment is a process that includes impregnating a sponge-iron layer with an iron alloying element (e.g., Ni or Cr). Another embodiment is a process that includes forming an iron oxide during the hot band rolling of iron, then reducing the iron oxide to form the sponge iron, and then depositing the iron alloying element (or impregnating the sponge-iron with the iron alloying element). Still another embodiment is a process that includes reducing an iron oxide layer to form a sponge-iron layer, then depositing the iron alloying element into/onto the sponge-iron layer, and then heating the impregnated sponge-iron layer to an annealing temperature. One embodiment of the product of the described processes includes an iron admixture layer carried by steel or a steel substrate, the product has a plurality of iron artifacts adhered to a surface of the steel and impregnation artifacts (e.g., an element other than iron) disposed between and around the iron artifacts. Another product embodiment includes an iron matrix surrounding impregnation artifacts (e.g., iron insoluble phases, nanocrystals, or intermetallics). Yet another product embodiment includes a porous substrate (e.g., a ceramic) that carries an interstitial layer that includes the substrate and iron, the interstitial layer carrying an iron layer, and the iron layer carrying an iron alloy layer.

A first embodiment of the herein described coating/alloying process can include providing a substrate that carries a sponge-iron layer. As used herein, sponge-iron is a three-dimensional porous layer made primarily of reduced iron. The sponge-iron, preferably, has a density less that of iron, more preferably less than 7.8 g/cm$^3$, less than 7.5 g/cm$^3$, less than 7 g/cm$^3$, less than 6 g/cm$^3$, less than 5 g/cm$^3$, less than 4 g/cm$^3$, less than 3 g/cm$^3$, or less than 2.5 g/cm$^3$. The sponge-iron layer can have a thickness that is preferably in a range of about 0.05 µm to about 1000 µm, about 0.1 µm to about 100 µm, about 0.5 µm to about 10 µm, about 5 µm to about 25 µm, or about 10 µm to about 20 µm. The process further includes admixing a first alloying element with the sponge-iron layer to provide an impregnated sponge-iron layer which is carried by the substrate. The first alloying element and the sponge-iron layer can be admixed by contacting the sponge-iron layer with an impregnating material selected from the group consisting of the alloying element, an alloying element precursor, a gaseous admixture comprising the alloying element or alloying element precursor, a solution comprising the alloying element or the alloying element precursor, and a mixture thereof. Preferably, the first alloying element and the sponge-iron layer are admixed by the deposition of the impregnating material into pores of the sponge-iron; alternatively, the first alloying element and the sponge-iron layer are admixed by the deposition of the impregnating material onto a surface of the sponge-iron layer. More preferably, the first alloying element and the sponge-iron layer are admixed by depositing the impregnating material into and onto the sponge-iron layer.

The process can further include admixing a second alloying element with the sponge-iron layer to provide the impregnated sponge-iron layer carried by the substrate. In one aspect, the second alloying element can be admixed with the sponge-iron sequentially, that is, after the admixing with the first alloying element. In one example, the sponge-iron is first admixed with the first alloying element and then the second alloying element. In another example, the sponge-iron is first admixed with the first alloying element, then the second alloying element, then the first alloying element. In still another example, this sequential admixing can continue, e.g., with the second alloying element, e.g., then the first alloying element, etc. In an alternative aspect, the second alloying element and the first alloying element can be admixed with the sponge-iron contemporaneously, for example, the first and second alloying elements can be co-deposited into the sponge-iron layer.

The impregnated sponge-iron layer can be provided by chemical vapor deposition, physical vapor deposition, or solution coating of the sponge-iron layer with the impregnating material. In one preferable, the impregnated sponge-iron layer is provided by the chemical vapor deposition of the impregnation material into or onto the sponge-iron layer, more preferably into the sponge-iron layer. In another example, the impregnated sponge-iron layer is provided by the physical vapor deposition of the impregnation material into or onto the sponge-iron layer. In still another example, the impregnated sponge-iron layer is provided by dip-coating or spray coating the impregnation material onto the sponge-iron layer, where the impregnation material can preferably flow (e.g., as a solution) into the sponge-iron layer. In yet another example, the impregnated sponge-iron layer can be provided by electrodeposition or electroless deposition of the alloying element onto/into the sponge iron layer.

The substrate, carrying the sponge-iron layer, can be selected from the group consisting of iron, aluminum, nickel, or an alloy thereof; a ceramic; or a glass. Preferably, the sponge-iron layer is adhered to the substrate. More preferably, the sponge-iron is physically and or chemically adhered to the substrate. For example, the sponge-iron layer can be adhesively adhered to the substrate, preferably the sponge-iron layer is physically part of the substrate; that is, there is no clear distinction between an end of the sponge-iron layer and a surface of the substrate (e.g., the substrate and the sponge-iron layer form an alloy or alloy layer therebetween). Preferably, the substrate is selected from the group consisting of iron, aluminum, nickel, or an alloy thereof. More preferably, the substrate is iron or an iron alloy. Even more preferably, the substrate is carbon steel, low carbon steel, or very low carbon steel.

In one example, the substrate can be a steel coil (e.g., a low carbon steel coil that is a steel sheet wrapped into a coil shape, the steel sheet having a thickness of about 1 mm to about 10 mm or about 2 mm to about 6 mm, and a length of about 300 m to about 900 m). When the substrate is a steel coil, the process of providing the substrate can include placing the steel coil within a reaction vessel. The reaction vessel can be, for example, a high pressure deposition chamber, an atmospheric pressure deposition chamber, a low pressure deposition chamber, a very low pressure deposition chamber, a UHV deposition chamber, a high temperature deposition chamber, a non-heated deposition chamber, or a combination thereof.

In one preferred example, the sponge-iron layer is prepared from an iron oxide layer. For example, the sponge-iron layer can be prepared from an iron oxide layer that is "native" to the substrate (e.g., iron oxides formed from an iron substrate, for example by oxidation), or from an iron oxide layer that is deposited onto the substrate (e.g., iron oxides deposited onto iron, aluminum, or silicon). The process of preparing the sponge-iron layer from the iron oxide layer can include providing to the iron oxide layer a reducing gas selected from the group consisting of hydrogen ($H_2$); hydrogen ($H_2$) and carbon monoxide (CO); hydrogen ($H_2$) and nitrogen ($N_2$); hydrogen ($H_2$) and nitrogen ($N_2$) in a ratio of about 1:9; carbon monoxide (CO) and carbon dioxide ($CO_2$). Furthermore, the process can include adding (providing) the reducing gas at a temperature in a range of about 300° C. to about 1000° C.; or at a temperature of about 400° C., about 500° C., about 600° C., about 700° C., or about 800° C. In a preferable example, the reducing gas is provided to the sponge-iron layer when the sponge-iron layer has a temperature of about 500° C.

As noted above, the iron oxide layer can be a prepared iron oxide layer. That is, the process described herein can include preparing the iron oxide layer on the substrate. The iron oxide layer can be prepared, for example, by physical vapor deposition of iron oxide onto the substrate, hot rolling the substrate in air, anodization of an iron layer carried by the substrate, or chemical vapor deposition of an iron oxide onto the substrate. Preferably, the iron oxide preparation provides an iron oxide layer that has a uniform (or about uniform) thickness on the substrate and provides an iron oxide layer that is tightly bound to the substrate. As used herein, tightly bound means the layer passes at least one of a forming test and a tape test. The forming test comprises the bending of the substrate carrying the layer about a radius that is about twice the combined thickness of the substrate and layer. If the layer does delaminate from the substrate upon the forming then the layer passes the test. Similarly, the layer passes the take test if, upon the application of a pressure sensitive adhesive sheet (e.g., SCOTCH tape) to a surface of the layer and the removal of the adhesive sheet by applying a force that would peel the adhesive sheet from the layer, the layer does not delaminate for the substrate (as determined by the layer remaining adhered to the removed adhesive sheet). In one preferable example, the iron oxide layer is prepared by hot rolling the substrate in air, for example hot rolling a steel substrate at a temperature above about 500° C., above about 750° C., or above about 1000° C. in air.

The process (and resultant product) can further include layers carried by the impregnated sponge-iron layer. In one example, the process can include depositing an overcoating onto the impregnated sponge-iron layer. The overcoating can be, for example, a layer of an alloying element (e.g., the same alloying element that is impregnating the sponge-iron layer, or a different alloying element), a plurality of alloying elements (e.g., as an alloy layer or as distinct/individual layers), an oxide (e.g., a silicon oxide, an aluminum oxide, or a transition metal oxide), or a nitride (e.g., a silicon nitride, or a transition metal nitride).

Still further, the process can include heating the impregnated sponge-iron layer. Optionally, heating the impregnated sponge-iron layer that is carrying the overcoating or depositing the overcoating after the impregnated sponge-iron layer is heated. For example, the impregnated sponge-iron layer can be heated to an annealing temperature. As used herein, the annealing temperature refers to the temperature the annealed layer/object attains and does not necessarily refer to the temperature of a gas surrounding the layer/object (e.g., the gas temperature can be significantly higher than the annealing temperature). The annealing temperature is dependent on the desired product (e.g., depth of diffusion of the alloying element(s) into the substrate). In one example, the annealing temperature can be about 300° C., about 400° C., about 500° C., about 600° C., about 700° C., about 800° C., about 900° C. or about 1000° C. Another feature can be the annealing time (which is often dependent on the annealing temperature) which can range from about 1 to about 100 seconds, from about 100 seconds to about 10 minutes, from about 10 minutes to about 1 hour, from about 1 hour to about 12 hours, from about 12 hours to about 24 hours, from 1 day to about 5 days, or from about 5 days to about 10 days. Preferably, the impregnated sponge-iron is heated in a non-oxidizing atmosphere and more preferably to a temperature in a range of about 600° C. to about 900° C.

The annealing (heating to the annealing temperature) of the impregnated sponge-iron layer can produce sponge-iron alloy layer. Furthermore, the annealing of the sponge-iron layer carrying an overcoating can produce a sponge-iron alloy layer. This sponge-iron alloy layer can include elements or features from the overcoating (e.g., an Ni overcoating on a Cr impregnated sponge-iron can produce a NiCrFe sponge-iron alloy layer, as could a Cr overcoating on a Ni impregnated sponge-iron).

In another example, the sponge-iron alloy layer can be overcoated, that is, the process can include depositing an overcoating onto the sponge-iron alloy layer. This overcoated sponge-iron alloy can be annealed or can be result of the process.

In yet another example of the process, the impregnated sponge-iron layer can be compressed. Methods of compressing the impregnated sponge-iron layer can include, for example, hot rolling, hot working, cold rolling, cold working, or compression molding. The hot rolling or hot working can include heating the impregnated sponge-iron layer to its annealing temperature and then rolling/working the substrate carrying the impregnated sponge-iron layer.

In still yet another example, the process can include heating the impregnated sponge-iron layer to a sintering temperature. While sintering and annealing are often analogous processes, sintering can include the recrystallization of a disordered powder into a solid alloy layer. Notably, both sintering and annealing include the rearrangement of atoms to yield a new crystal lattice, for example distinguishable from the starting material from the size of crystal grains, the orientation of crystal grain boundaries, or the composition when diffusion is present, herein, sintering preferably refers to the growth of a solid layer or form from a physical mixture of a plurality of components. Importantly, some processes can include both sintering and annealing. The sintering temperature can be above the annealing temperature or can be below the annealing temperature. For example, the sintering temperature can be about 100° C., about 200° C., about 300° C., about 400° C., about 500° C., about 600° C., about 700° C., about 800° C., about 900° C., about 1000° C., about 1100° C., about 1200° C., about 1300° C., about 1400° C., or about 1500° C.

The sintered sponge-iron layer, i.e., a sintered alloy coating, can be physically or chemically processed. In one example, the sintered alloy coating can be pressed (e.g., hot rolled or cold rolled). In another example, the sintered alloy coating can be coated with an infiltration element (e.g., another alloying element). The coating with the infiltration element can be by any of the deposition processes described above (e.g., chemical vapor deposition or physical vapor deposition). After coating with the infiltration element, the coated, sintered alloy coating can be annealed to form an annealed alloy layer. In yet another example, the sintered alloy coating can be coating with an overcoating.

In another embodiment, the steel manufacturing process can include forming an iron oxide layer on a hot band during hot rolling; reducing the iron oxide layer on the hot band to form a sponge iron layer that includes pores; and depositing an alloying element into the pores of the sponge iron layer to form an impregnated sponge-iron layer. As used herein, a hot band is a strip of steel that has undergone hot rolling and has not undergone significant cooling or quenching. This process can further include depositing a plurality of alloying elements into the pores of the sponge iron layer. This process can further include hot rolling and/or annealing the impregnated sponge-iron layer to form an alloy layer.

This process includes multiple actions that can be performed in a steel mill, for example, formation of the iron oxide layer can include hot rolling steel at a temperature greater than about 1,000° C. in the presence of oxygen (e.g., in air). Reducing this iron oxide layer can be accomplished by exposing the iron oxide layer to a reducing atmosphere; and reducing iron oxide in the iron oxide layer to iron(0).

In one example, the alloying element or elements is/are selected from the group consisting of magnesium, aluminum, silicon, titanium, vanadium, chromium, manganese, cobalt, nickel, copper, zinc, strontium, zirconium, niobium, molybdenum, ruthenium, rhodium, palladium, silver, tin, antimony, and tantalum. In one preferable example, at least one alloying element is nickel, chromium, manganese, and/or molybdenum. In another example, a plurality of alloying elements is selected from nickel, chromium, manganese, and molybdenum.

In yet another embodiment the iron alloy coating process can include providing an substrate carrying an iron layer that carried an iron oxide layer; reducing the iron oxide layer to a sponge-iron layer that include pores; depositing at least one alloying element into the pores of the sponge iron layer to from an impregnated sponge-iron layer; and then heating the impregnated sponge-iron layer to an annealing temperature. In one example, the substrate can be a ceramic or a ceramic material.

The above process, described in a plurality of embodiments, provides iron containing products carried by a substrate that can include iron. In one embodiment, the product is an iron admixture layer carried by steel that includes a plurality of iron artifacts adhered to a surface of the steel; a plurality or continuation of impregnation artifacts disposed between and around the iron artifacts; and extending from the steel surface a concentration gradient within the iron admixture layer that includes a decrease in iron concentration as a function of distance from the steel surface. As described above, the sponge-iron layer includes iron (e.g., as granules or artifacts on the surface of the substrate) adhered to the surface of the substrate and pores. In this embodiment, the iron artifacts are part of the sponge-iron layer and, without being bound to theory, are believed to exist as an agglomeration of iron particles adhered to the substrate surface. The impregnation artifacts occupy space (pores) within the sponge-iron layer and can occupy the entire space (filled) or less than the entire space (loaded). Notably, the impregnation artifacts occupy space in and around particles of iron. As a result of the process described above, the sponge-iron layer and thereby the iron artifacts can have a density that increases with depth; such that, as a function of distance from the steel substrate surface, the concentration of iron can decrease. This change in iron concentration can be expressed as a concentration gradient (measurable by, for example, XPS analysis). Herein, the concentration gradient preferably includes a decrease in iron concentration as a function of distance from the steel surface, and, preferably, though not necessarily, an increase in concentration of the impregnation artifacts in the iron admixture layer.

In another embodiment, the iron admixture layer carried by steel includes a plurality of impregnation artifacts (e.g., intermetallics) surrounded by an iron matrix; the iron admixture layer having a thickness of less than 100 μm. The impregnation artifacts can be iron insoluble materials or particles, or phase distinct materials or particles. One example of an impregnation artifact is an intermetallic particle. Examples of intermetallics can include iron aluminides, iron silicides, iron germinides, nickel aluminides, nickel silicides, and magnetic intermetallics (e.g., YFeTi or SmFeTi intermetallics). Another example of impregnation artifacts can be nitrides, sulfides, oxides, and phosphides.

In still another embodiment, an iron alloy coated substrate can include a porous substrate having an interstitial layer that comprises a heterogeneous admixture of the substrate and iron; the interstitial layer carrying an iron layer; the iron layer carrying an iron alloy layer that comprises iron and at least one alloying element. In one example, the porous substrate is a porous ceramic; and the interstitial layer comprises iron within the porous ceramic.

What is claimed:

1. A steel manufacturing process comprising:
   forming an oxide layer on a steel substrate during hot rolling;
   reducing the iron oxide layer on the steel substrate to a sponge iron layer that includes pores; and
   depositing an alloying element selected from the group consisting of nickel, chromium, manganese, and molybdenum into the pores of the sponge iron layer to form an impregnated sponge-iron layer.

2. The steel manufacturing process of claim 1, further comprising depositing a second alloying element into the pores of the sponge-iron layer to the impregnated sponge-iron layer carried by the substrate.

3. The steel manufacturing process of claim 1, wherein the steel substrate comprises iron or an iron alloy.

4. The steel manufacturing process of claim 1, wherein reducing the iron oxide layer comprises contacting the iron oxide layer on the steel substrate with a reducing gas selected from the group consisting of hydrogen ($H_2$); hydrogen ($H_2$) and carbon monoxide (CO); hydrogen ($H_2$) and nitrogen ($N_2$); and carbon monoxide (CO) and carbon dioxide ($CO_2$).

5. The steel manufacturing process of claim 1, further comprising heating the impregnated sponge-iron layer to an annealing temperature and forming an iron alloy layer.

6. The steel manufacturing process of claim 1 further comprising depositing a plurality of alloying elements into the pores of the sponge iron layer.

7. The steel manufacturing process of claim 1 further comprising:
   annealing the impregnated sponge-iron layer.

8. The steel manufacturing process of claim 1, wherein reducing the iron oxide layer comprises:
   exposing the iron oxide layer to a reducing atmosphere; and
   reducing the iron oxide in the iron oxide layer to iron(0).

9. A steel manufacturing process comprising:
   forming an oxide layer on a steel substrate during hot rolling;
   reducing the iron oxide layer on the steel substrate to a sponge iron layer that includes pores; and
   depositing an alloying element into the pores of the sponge iron layer to form an impregnated sponge-iron layer; and
   hot rolling the impregnated sponge-iron layer.

10. The steel manufacturing process of claim 9, wherein the alloying element is selected from the group consisting of magnesium, aluminum, silicon, titanium, vanadium, chromium, manganese, cobalt, nickel, copper, zinc, strontium, zirconium, niobium, molybdenum, ruthenium, rhodium, palladium, silver, tin, antimony, tantalum, and a mixture thereof.

11. The steel manufacturing process of claim 9, further comprising depositing a second alloying element into the pores of the sponge-iron layer to the impregnated sponge-iron layer carried by the substrate.

12. The steel manufacturing process of claim 9, wherein the steel substrate comprises iron or an iron alloy.

13. The steel manufacturing process of claim 9, wherein reducing the iron oxide layer comprises contacting the iron oxide layer on the steel substrate with a reducing gas selected from the group consisting of hydrogen ($H_2$); hydrogen ($H_2$) and carbon monoxide (CO); hydrogen ($H_2$) and nitrogen ($N_2$); and carbon monoxide (CO) and carbon dioxide ($CO_2$).

14. The steel manufacturing process of claim 9, further comprising heating the impregnated sponge-iron layer to an annealing temperature and forming an iron alloy layer.

15. The steel manufacturing process of claim 9 further comprising depositing a plurality of alloying elements into the pores of the sponge iron layer.

16. The steel manufacturing process of claim 9 further comprising:
   annealing the impregnated sponge-iron layer.

17. The steel manufacturing process of claim 9, wherein reducing the iron oxide layer comprises:
   exposing the iron oxide layer to a reducing atmosphere; and
   reducing iron oxide in the iron oxide layer to iron(0).

* * * * *